United States Patent [19]
Holtermann

[11] 4,102,196
[45] Jul. 25, 1978

[54] HEAT SENSOR

[76] Inventor: Ludwig K. Holtermann, 43 Ragged Rock Rd., Old Saybrook, Conn. 06475

[21] Appl. No.: 786,004

[22] Filed: Apr. 8, 1977

[51] Int. Cl.² ............................................. G01K 7/06
[52] U.S. Cl. .................................. 73/341; 73/190 H; 73/DIG. 7
[58] Field of Search ...................... 73/341, 355 R, 361, 73/DIG. 7; 136/213, 214, 224, 225

[56] References Cited
U.S. PATENT DOCUMENTS

| | | | |
|---|---|---|---|
| 2,357,193 | 8/1944 | Harrison | 73/355 |
| 3,246,519 | 4/1966 | Dornberger | 136/224 X |
| 3,255,632 | 6/1966 | Brooks | 73/355 |
| 3,430,492 | 3/1969 | Matsumoto et al. | 136/224 |
| 3,525,260 | 4/1970 | Kung | 73/355 |
| 3,596,514 | 8/1971 | Mefferd et al. | 73/190 |
| 3,939,706 | 2/1976 | Pinson | 73/190 |
| 4,003,250 | 1/1977 | Poppendick et al. | 73/190 |

*Primary Examiner*—Herbert Goldstein
*Attorney, Agent, or Firm*—DeLio and Montgomery

[57] ABSTRACT

A non-contact sensor for observing, recording or responding to the temperature of a hot moving or stationary slender target, such as a wire, wherein a plurality of sensor units, each including a multiplicity of thermocouples, are mounted in arcuate formation within a cylindrical housing and connected in series, the housing being radially slotted so that the target can be introduced laterally and guided on a path along the axis of the housing, the end terminals of the sensor units being adapted for direct attachment to indicating, recording or actuating devices, without signal amplification.

8 Claims, 7 Drawing Figures

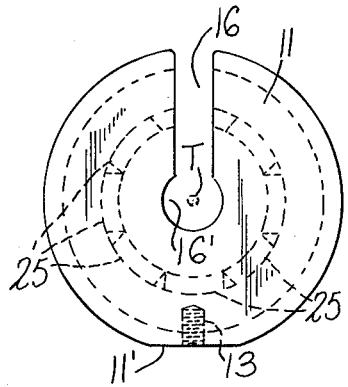
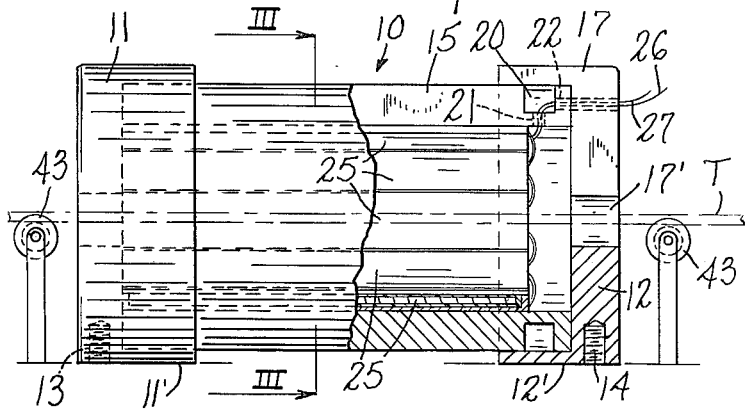
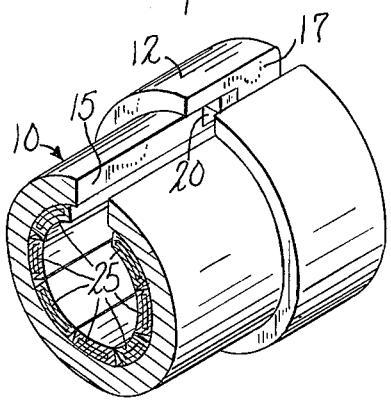
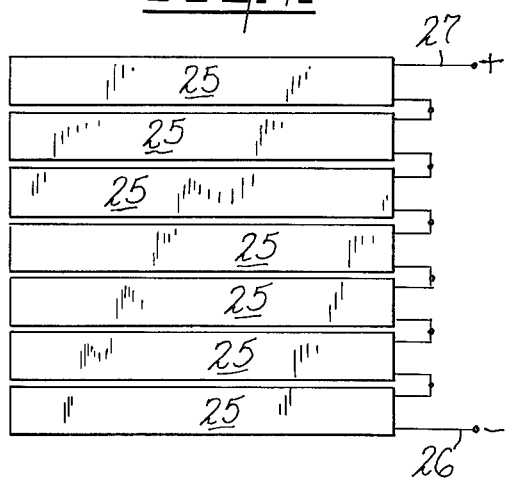
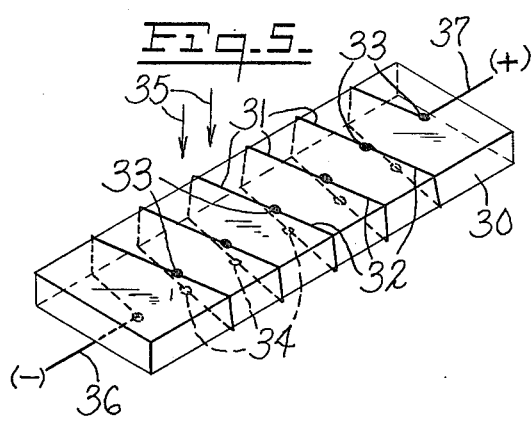
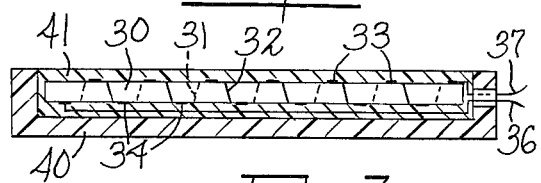
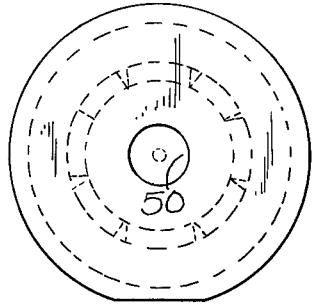

HEAT SENSOR

This invention relates to a temperature sensor for use with a moving or stationary slender target, such as a wire, in order to observe, record and/or respond in some manner to the temperature of the target and changes in such temperatures.

It is known to provide a heat sensor for a filamentary object such as a wire or yarn wherein the target is passed through a housing in a manner to have a thermal effect on one or more thermocouples or thermopiles, but such devices have generally included means for equalizing the temperature of hot and cold junctions, as in U.S. Pat. No. 3,430,492, Matsumoto et al, and U.S. Pat. No. 3,525,260, Kung, or means for equalizing the temperature of a thermocouple element and of the strand being monitored, as in U.S. Pat. No. 3,465,589, Flook. In instruments designed to operate in such manners the circuitry is necessarily more or less complex and delicate, with resultant increased cost of manufacture and maintenance.

It is accordingly an object of the invention to provide a temperature sensor wherein a plurality of sensor units are mounted in a cylindrical, heat conductive, housing, each unit comprising a multiplicity of thermocouples having hot junctions on the side of the unit nearest the axis of the housing and cold junctions on the side more remote from the axis, the units being connected in series and the terminals of the whole assembly being adapted for connection to a meter, electronic controller or other indicating, recording and/or actuating instrument; the housing is preferably slotted to permit lateral engagement of the sensor with a filamentary target, such as a wire.

It is a further object of the invention to provide such a sensor wherein the EMF (mV) generated in the thermocouples, in response to the heat flux of the target, is adequate to give an informative signal without need for amplification.

It is another object of the invention to provide a heat sensor of compact size which can easily be mounted on a machine in a position permitting accurate orientation of the target.

It is a still further object of the invention to provide a heat sensor which operates effectively without a reference temperature junction, and wherein the sensor output, in millivolts is directly proportional to the radiant heat flux and analogue to the target temperatures.

It is yet another object of the invention to provide certain improvements in the form, construction, arrangement and materials of the several parts whereby the above-named and other objects may effectively be attained.

The invention accordingly comprises an article of manufacture possessing the features, properties, and the relation of elements which will be exemplified in the article hereinafter described, and the scope of the invention will be indicated in the claims.

A practical embodiment of the invention is shown in the accompanying drawing, wherein FIG. 1 represents an end elevation of the sensor;

FIG. 2 represents a side elevation, parts being broken away and parts being shown in section;

FIG. 3 represents a perspective view of a portion of the sensor, cut along the line III—III of FIG. 2;

FIG. 4 represents a somewhat diagrammatic plan view of the sensor units laid out in a row to show their interconnection;

FIG. 5 represents a detail diagrammatic perspective view of a single sensor unit substrate and wire winding;

FIG. 6 represents a longitudinal section through a sensor unit, and

FIG. 7 represents an end view of a modified form, without the radial slot.

Referring to the drawing, the heat sensor includes a cylindrical housing 10 of a material having high thermal conductivity such as copper or aluminum, the housing having a wall thickness of about 15mm. and defining a cylindrical chamber with a diameter of about 50mm., the dimensions being those of a typical example and not intended as limitation. The housing shown has a length of about 78mm. and its ends are covered by flanged caps 11 and 12, preferably of stainless steel. Each cap has a flattened base surface 11', 12' wherein threaded bores 13, 14 are provided, for use in mounting the sensor on a support such as a machine frame or other part. According to FIGS. 1, 2 and 3, the housing is provided with a longitudinal slot 15, and the caps are radially slotted at 16 and 17 the cap slots being in register with the slot 15 to provide access into the housing for an elongated target such as a wire. The ends of the slots 16, 17 may suitably be enlarged to form circular openings 16', 17' the walls of which are concentric with the outer wall of the housing.

An annular groove 20 is formed in the outer surface of the housing close to one end, this groove being in communication with the interior by means of at least one radial hole 21. The cap 12 and adjacent end of the housing are drilled as shown at 22 to form a passage from the groove 20 to the exterior of the instrument.

A plurality of sensor units 25 are mounted within the housing, extending longitudinally thereof and cemented in place. These units are connected in series, as indicated in the laid-out diagram, FIG. 4, and their end terminals 26, 27 pass through the hole or holes 21 into the groove 20 and thence out through the passage 22, for connection to any appropriate instrument.

Each sensor unit comprises, basically, an electrically non-conductive substrate 30 and a winding of wire made up of alternating sections of copper 31 and constantan 32, for example, so proportioned that hot junctions 33 appear on one surface of the substrate and cold junctions 34 are on the opposite surface. Assuming a heat flow, as from the strand being monitored, in the direction of the arrows 35 in FIG. 5, the several hot and cold junctions will form a series of thermocouples and an EMF, measurable in millivolts (mV) will appear at the terminals 36 and 37. The wire is very fine and a single sensor unit may have on the order of 200 turns. For protection durability and convenience in handling, each basic unit may suitably be set in a tray 40 (FIG. 6) of an electrically non-conductive material such as a high temperature plastic, the working parts being potted in and covered by means of an epoxy 41 or a ceramic cement, for high temperatures. The terminal wires 36, 37 are shown as exiting from one end of the tray in convenient positions for connection to the terminals of an adjacent unit. The end terminals of the series are designated 26 and 27 in FIG. 4.

In use, the sensor is fixed on a suitable support which may be on or near a machine associated with the processing of a filamentary material (wire, plastic strand or tube, yarn or the like) and the end terminals 26, 27 are connected to a monitoring instrument or device which may be a potentiometer, meter, recorder or other instrumentality adapted to respond to variations in the EMF (mV) from the sensor. The material being monitored, designated as the target T in FIG. 1, is led on a path corresponding substantially to the axis of the housing 10, guidance on such path being provided by fixed or rotating guides, indicated generally at 43, in a conventional manner. In most instances the sensor will be used with a traveling filament, but it could also sense constant or variable temperatures of a stationary object introduced into the target position.

As to any designated area A of a sensor unit, the radiant heat flux $Q_1$ entering from the target T passes a hot junction with a temperature $t_1$ and then a cold junction with a temperature $t_2$, spaced radially by a distance $\Delta l$, the heat flux $Q_2$ exiting into the heat sink constituted by the body 10. Assuming $t_1$ to be greater than $t_2$ the temperature gradiant is $\Delta t$. According to the heat conduction law $Q = K A/\Delta l \Delta t$ where K is the conductivity constant of the material of the substrate 30. The thermocouple junctions react to the temperature difference in millivolts and the arrangement of a multiplicity of such thermocouples in series in each sensor unit, with a plurality (e.g., three or more — seven shown herein) of such units also in series raises the mV level to usable values. The mV output usually has to be converted or calibrated into temperature ° F or ° C. However, the mV output is not proportional to target temperature because it follows the radiation law: $Q = B A (T_1^4 - T_2^4)$ where B = Boltzmann's constant and T is absolute temperature in degrees Rankine (° R) or Kalvin (° K). If conversion or calibration is considered to be inadequate, a linearization circuit could be provided.

Further explaining the principal of operation, when a heated stationary or moving target, such as a wire, is present at the longitudinal axis of a sensor device as illustrated in FIGS. 1 and 2, a radiation heat exchange occurs between the target and the sensor units. Assuming the target temperature to be greater than the sensor temperature, the heat radiated by the target is dissipated in the sensors, which preferably have a black surface having an absorptivity $\alpha = 0.93$. Since the target is nearly encircled by the sensor, almost all of its radiant energy over a given length is captured by the sensor units, resulting in high sensitivity (i.e. efficient translation of target temperature into millivolt output).

While the slotted form of sensor is obviously most practical for use with a moving target, it could be made without the slot, as shown in FIG. 7, in which case a moving strand or filament would be threaded through the axial openings 50, or a suitably sized target could be inserted, monitored and withdrawn.

Exact centering of the target is not essential, since the sensor units are on all sides of the target and small variations in radial spacing are self-compensating.

The end caps with central openings and with or without slots insure proper orientation of the target, serve as covers for shielding off undesired external radiation which could affect the target temperature readings, and also form convenient mounting elements for the sensor device.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanyig drawings shall be interpreted as illustrative and not in a limiting sense.

What I claim is:

1. A temperature sensor for monitoring the temperature of an elongated slender target comprising a hollow cylindrical housing of heat conductive material, flanged cap members, one fitted on each end of the housing, openings in the center of each cap member providing access to the interior of the housing and located on the axis thereof, and a plurality of sensor units fixed to the interior wall of the housing and extending axially thereof, each sensor unit comprising an elongated electric non-conductive substrate, a wire winding on said substrate, the wire being made up of different materials adapted to form thermocouples at their junction points and being so wound on the substrate as to provide a multiplicity of axially aligned hot junctions along one surface of the substrate and a multiplicity of axially aligned cold junctions along an opposite surface of the substrate, the sensor units being connected in series and the end terminals of the series being adapted for connection to an instrument.

2. A temperature sensor according to claim 1 wherein each wire-wound substrate is embedded in insulating material.

3. A temperature sensor according to claim 2 wherein each wire-wound substrate is set individually in an elongated tray of insulating material.

4. A temperature sensor according to claim 1 wherein the housing and the cap members are radially slotted, each cap member slot extending from the periphery of the cap to the center opening therein.

5. A temperature sensor according to claim 4 wherein each center opening has a diameter substantially greater than the width of the slot, whereby targets in a wide range of sizes can be monitored.

6. A temperature sensor according to claim 1 wherein the series of sensor units are adapted to produce an effective EMF (mV) directly representative of the target temperature.

7. A temperature sensor according to claim 1 wherein the housing is provided near one end with an annular space adapted to accommodate wiring elements and the cap on said one end is provided with an opening for passage of wiring elements outward from said annular space.

8. A temperature sensor according to claim 1 wherein the cap members are of stainless steel and at least one of said cap members is provided with means for securement to a fixed support.

* * * * *